United States Patent [19]

Ferrieu

[11] 4,356,354
[45] Oct. 26, 1982

[54] ELECTRONIC SUBSCRIBER JUNCTOR

[75] Inventor: Gilbert M. M. Ferrieu, Bievres, France

[73] Assignee: Telecommunications Radioelectriques et Telephoniques T.R.T., Paris, France

[21] Appl. No.: 159,732

[22] Filed: Jun. 16, 1980

[30] Foreign Application Priority Data

Jun. 25, 1979 [FR] France ................. 79 16261

[51] Int. Cl.³ ............... H04M 1/76; H04M 19/00
[52] U.S. Cl. ........................ 179/16 AA; 179/16 F; 179/170 NC
[58] Field of Search ............ 179/77, 170 NC, 16 F, 179/16 AA, 18 H

[56] References Cited

U.S. PATENT DOCUMENTS 4,181,824  1/1980  Seidel ..................... 179/170 D

FOREIGN PATENT DOCUMENTS 2551816  6/1976  Fed. Rep. of Germany ........ 179/77
2024564  1/1980  United Kingdom ............... 179/77

Primary Examiner—Thomas W. Brown
Attorney, Agent, or Firm—Thomas A. Briody; William J. Streeter; Laurence A. Wright

[57] ABSTRACT

For feeding a telephone subscriber's line without the use of a transformer, this junctor comprises a symmetrical amplifier whose two input terminals receive two negative feedback voltages derived from a weighted sum current of the currents entering and leaving the subscriber's line. To form this weighted sum current, use is made of a current mirror whose summing and input terminals are connected respectively to one terminal of the supply source and to the corresponding supply terminal of the amplifier, and a voltage divider connected between the output of the current mirror and the other terminal of the supply source and whose intermediate terminal is connected to the other supply terminal of the amplifier. The voltage ratio of the voltage divider is equal to the current ratio of the current mirror. The voltage at the ends of the voltage divider is applied to a voltage follower which is regulated to provide the weighted sum current with the desired amplitude.

13 Claims, 8 Drawing Figures

ELECTRONIC SUBSCRIBER JUNCTOR

The invention relates to a subscriber junctor. More particularly, the invention relates to a subscriber junctor which is provided with means for forming a weighted sum current of the currents entering and leaving the subscriber's line.

BACKGROUND OF THE INVENTION

It is known that a subscriber junctor is a device for connecting each subscriber's line to a telephone exchange and therefore has to fulfill a certain number of functions, including supplying the subscriber's line with direct current, transmitting the conversation signals between the subscriber's line and the telephone exchange, and transmitting metering signals towards the subscriber. In order to fulfil these functions a certain number of requirements must be met, such as the possible reversal of the direction of the direct current circulating in the subscriber's line, a minimum feeding bridge resistance (for example 300 $\Omega$) with equal distribution of this resistance on each terminal of the supply source, a specific value of the impedance of the junctor for the speech currents (for example 600 $\Omega$) with perfect symmetry of this impedance with regard to ground, and a high output as regards transmission of the speech signals.

A subscriber junctor of the type mentioned in the preamble was described in the French patent application, not yet published, filed by the Applicant on June 26, 1978 under the number 78 18 960 and in the certificate of addition filed on Sept. 28, 1978 under the number 78 27 762. The patent application and the certificate of addition concern a junctor for four-wire and two-wire coupling to the exchange, respectively. As will be explained in detail hereinafter, this junctor fulfils the various functions mentioned above by purely electronic means and in particular without the use of a transformer, which enables the junctor to be made substantially in the form of an integrated circuit.

The present invention aims to make various improvements to a subscriber junctor of this type, the aim of these improvements being to facilitate the practical realisation and utilisation thereof and/or to further improve the characteristics thereof.

OBJECT OF THE INVENTION

One object of the invention is to provide a device making it possible to obtain the weighted sum current of the currents entering and leaving the subscriber's line. In order to respect the symmetry characteristics of the junctor, it is important that the weighting coefficients used to weight these two currents should be roughly equal (to 1% for instance). A known solution for this device consists of using two current mirrors, each measuring one of the two aforementioned currents, and in forming the sum of the output currents of the current mirrors. One drawback of this solution is that, constructionally, particularly in an integrated circuit, it is difficult to obtain current mirrors having equal current ratios of the desired accuracy. Moreover, this solution does not allow adjustment of the amplitude of the weighted sum current, this adjustment being very useful for obtaining different specific characteristics in the junctor envisaged. The invention makes it possible to reduce these drawbacks.

SUMMARY OF THE INVENTION

In accordance with the invention, in order to form the weighted sum current, the junctor comprises a current mirror, the summing terminal and input terminal of which are linked to a terminal of the d.c. power supply and to the corresponding supply terminal of the symmetrical power amplifier, respectively, the output terminal of this current mirror being connected to one end of a voltage divider circuit, the other end and the intermediate terminal of which are connected to the other terminal of the d.c. power supply and to the corresponding supply terminal of the aforesaid amplifier, respectively, the voltage ratio of the voltage divider circuit being adjusted so as to be substantially equal to the current ratio of the current mirror, the voltage at the ends of the voltage divider circuit being applied to a voltage follower circuit which is regulated so as to provide the said weighted sum current with the desired amplitude.

The invention also provides an advantageous form of construction for a current mirror, the current ratio of which is determined by the ratio of two resistances and a voltage follower circuit with a particularly linear characteristic.

To facilitate the attainment of specified values of feeding bridge resistance and junctor impedance, it is advantageous for the adjustable resistance of the voltage follower circuit used to regulate the amplitude of the weighted sum current to be divided into two resistances, one of which is decoupled by a capacitor whose impedance value is very low for the speech currents, the resistance value of the feeding bridge of the junctor being regulated by means of the decoupled resistance, without modifying the impedance of the junctor for the speech currents.

With an adjustable resistance of the voltage follower circuit formed by two resistances, one of which is decoupled by a capacitor, it becomes very simple to produce under certain circumstances, different modes of d.c. supply for the subscriber's line.

Thus it is advantageous, when the exchange has detected a wrong call on the part of the subscriber, for the value of the said resistance decoupled by a capacitor to be reduced automatically, in order to reduce the direct current in the subscriber's line.

Moreover, in order to use the junctor on very short subscribers' lines, so as to limit the direct current supplied to this line by the junctor, it is advantageous to use a threshold circuit which receives at its input at least a fraction of the voltage at the terminals of the said resistance decoupled by a capacitor and which, where the threshold is exceeded, provides a current which is added to the said weighted sum current.

The invention also provides a simple means for supplying the subscriber's line with the oscillation trains of the metering signal (at a frequency of 12 kHz for example), while avoiding any emission of a corresponding signal in the direction of the exchange.

To this end, the junctor comprises a separator circuit which transmits the voltage at the terminals of the said load impedance towards the input of the aforesaid means of dephasing and switching, means for modulating the voltage applied to this input during the oscillation trains of the metering signal, by a signal having the frequency of the said oscillations, and finally means of filtering in order to suppress practically every component at this frequency in the weighted sum current.

The said means of filtering are advantageously constituted by a simple series resonant circuit tuned to the frequency of the oscillations of the metering signal and connected between the two supply terminals of the symmetrical power amplifier.

BRIEF DESCRIPTION OF THE DRAWINGS

The description which follows, along with the attached drawings, the whole given by way of an example, will permit a good understanding of how the invention can be realized wherein.

DESCRIPTION OF THE PREFERRED EMBODIMENTS

Figure 1:
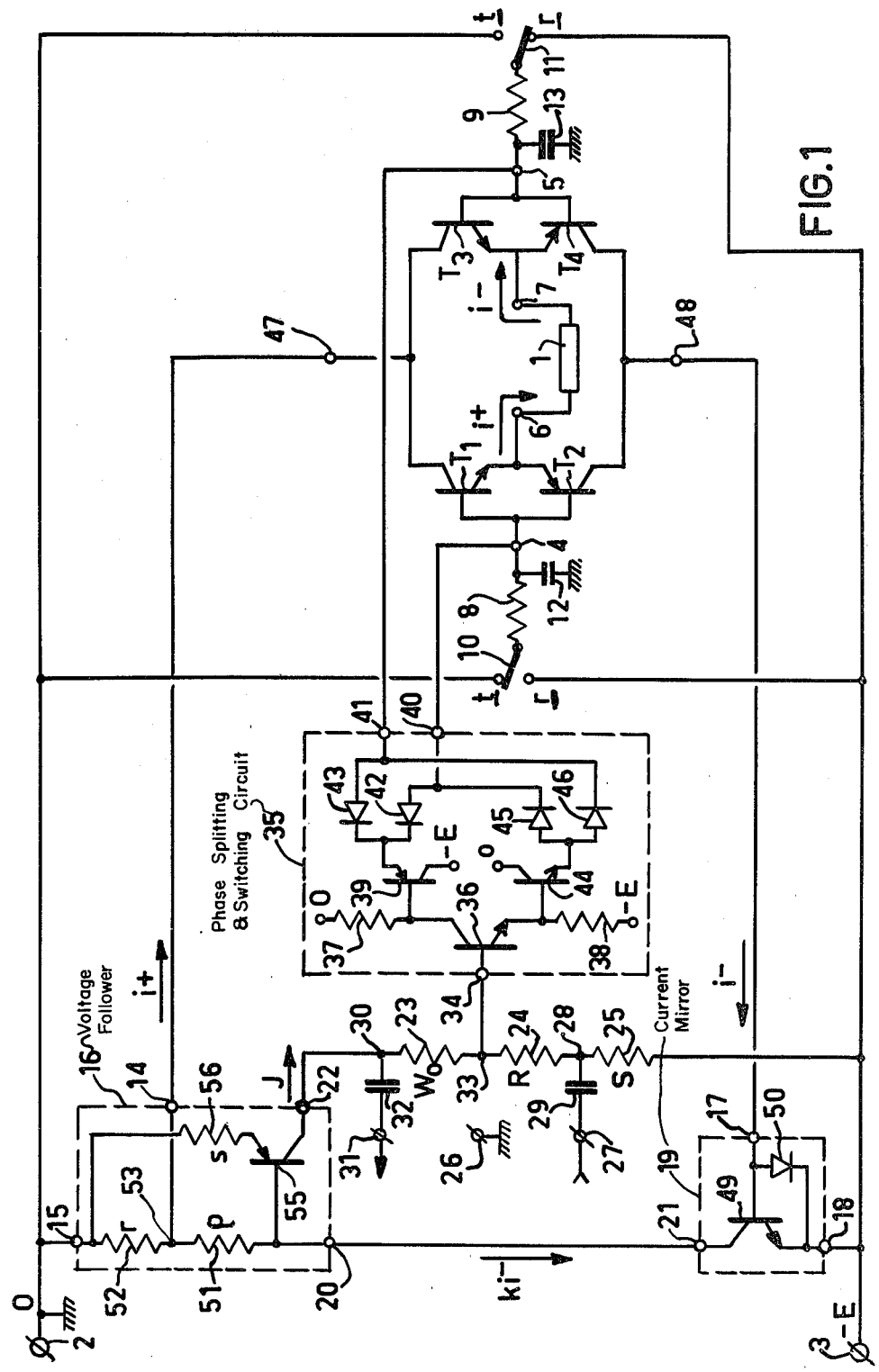
FIG. 1 represents a junctor in accordance with the invention, provided with a device for forming the weighted sum current.

The diagram of a junctor according to the invention is represented in FIG. 1. One function of this junctor is to ensure the supply of direct current to the subscriber's line 1, from a d.c. power supply source whose positive terminal 2 is at the potential zero of the substrate and whose negative terminal 3 is at a potential $-E$ ($-48$ V for example).

This junctor comprises a symmetrical power amplifier formed by two pairs of complementary transistors ($T_1$, $T_2$) and ($T_3$, $T_4$). Each of these transistors can be a composite transistor known as a Darlington circuit.

The collectors of the npn transistors $T_1$ and $T_3$ are interconnected and linked to a supply terminal 47 of the amplifier and the collectors of the pnp transistors $T_2$ and $T_4$ are interconnected and linked to the other supply terminal 48 of the amplifier.

The bases of the transistors of each pair ($T_1$, $T_2$) and ($T_3$, $T_4$) are interconnected and linked to the input terminals 4 and 5, respectively, of the amplifier. These input terminals 4 and 5 are linked to the supply terminals 2 and 3 via the resistances 8 and 9 and the switching circuits 10 and 11 set at opposite positions t and r. In addition, the two input terminals 4 and 5 are linked to ground by way of the capacitors 12 and 13.

The emitters of transistors ($T_1$, $T_2$) and ($T_3$, $T_4$) are likewise interconnected and linked to the output terminals 6 and 7, respectively, of the symmetrical amplifier. These output terminals 6 and 7 are connected to the two conductors of the subscriber's line 1.

The supply terminal 47 of the symmetrical amplifier is linked to the positive terminal 2 of the supply source, by way of terminals 14 and 15 of a circuit 16 which will be described hereinafter. The other supply terminal 48 of the amplifier is linked to the negative terminal 3 of the supply source by way of terminals 17 and 18 of a circuit 19 which will be described hereinafter. The circuits 16 and 19 are linked by their respective terminals 20 and 21 and cooperate, as will be explained hereinafter to form a mode of realisation of the device which generates the weighted sum current of the current entering the subscriber's line and the current leaving the subscriber's line.

In the circuit shown in FIG. 1, four-wire coupling with the exchange is envisaged and this coupling can be realised advantageously, as will be explained hereinafter, by applying the weighted sum current J which appears at the terminal 22 of the circuit 16 to a circuit of three resistances in series 23, 24, 25, linked to the supply terminal 3. The four-wire access of the junctor to the exchange is formed in the following way. The point of interconnection 28 of the resistances 24 and 25 is connected to the terminal 27 via a capacitor 29, the signals coming from the exchange being applied between the input terminal 27 of the junctor and the terminal 26 connected to ground. The end 30 of the resistance 23 is connected to the terminal 31 via a capacitor 32, the signals for transmission to the exchange being available between the output terminal 31 of the junctor and the terminal 26 connected to ground. The capacitors 29 and 32 have a very low impedance for the conversation signals transmitted.

The junction 33 of the resistances 23 and 24 is linked to the input 34 of a phase splitting and switching circuit 35. The circuit 35 comprises an npn transistor 36, the base of which is connected to the input 34, and the collector and emitter of which are connected to one end of the resistances of equal value 37 and 38, the other end of which is at the potential 0 and $-E$ of the supply terminals 2 and 3. The collector of the transistor 36 is connected to the base of the pnp transistor 39, the collector of which is carried to the supply potential $-E$, and the emitter of which is connected to the output terminals 40 and 41 of the circuit 35 via the diodes 42 and 43 poled for conduction in the same direction as the emitter-base diode of the said transistor 39. The emitter of the transistor 36 is connected to the base of the npn transistor 44, the collector of which is connected to the potential 0 and the emitter of which is connected to the terminals 40 and 41 via diodes 45 and 46 poled for conduction in the same direction as the base-emitter diode of the said transistor 44. The output terminals 40 and 41 of the circuit 35 are connected to the input terminals 4 and 5 respectively of the symmetrical power amplifier.

If the absence of this circuit 35, that is to say assuming for instance that the links between the terminals 40, 4 and 41, 5, are cut, the voltages applied at the input terminals 4 and 5 of the symmetrical amplifier are 0 and $-E$, respectively, when the switching circuits 10 and 11 are permanently established in the position indicated in the figure. The transistors $T_1$ and $T_4$ are then conducting and the transistors $T_2$ and $T_3$ are non-conducting. Ignoring the voltage drops in the emitter-base diodes of the transistors T and $T_4$, these voltages 0 and $-E$ are found again at the output terminals 6 and 7 of the symmetrical amplifier, so that the subscriber's line 1 is fed by a voltage of amplitude E making the direct current circulate in the direction from terminal 6 to terminal 7.

The function of the phase splitting and switching circuit 35, which is now assumed to be connected, will now be explained. The voltage at the terminals of the two series resistances 24 and 25 is called u, said voltage u resulting from the circulation of the weighted sum current J and resulting also from the application at terminal 27 of the speech signals coming from the exchange. The voltage (with respect to ground) applied to the input 34 of circuit 35 is therefore $-E+u$. On the emitter of the transistor 36 the voltage $-E+u$ appears and on its collector the voltage $-u$. Via the base-emitter diode of the transistor 39, the diode 42 and the terminal 40, this voltage $-u$ is transmitted on the input terminal 4 of the symmetric amplifier and via the base-emitter diode of the transistor 44, the diode 46 and the terminal 41, the voltage $-E+u$ is transmitted on the input terminal 5 of the symmetrical amplifier. Thus to the voltages 0 and $-E$ which appeared at the two input terminals 4 and 5 of the symmetrical amplifier, thanks to circuit 35, two degenerative feedback voltages $-u$ and $+u$ have been added. The voltages $-u$ and $-E+u$ appearing at the input terminals 4 and 5 are transmitted via the base-emitter diodes of transistors $T_1$ and $T_4$ to the output terminals 6 and 7, respectively, of the symmetrical amplifier. The subscriber's line is now supplied by a voltage of amplitude $E-2u$, making the direct current circulate in the direction from terminal 6 to terminal 7.

If the switching circuits 10 and 11 are established in the reverse position to that shown in the figure, the voltages at the input terminals 4 and 5 of the symmetrical amplifier are $-E$ and O, respectively, in the absence of circuit 35, and the direct current in the subscriber's line circulates in the direction from terminal 7 to terminal 6. With circuit 35 present, it is easy to see that the two degenerative feedback voltages $+u$ and $-u$ are applied to the two input terminals 4 and 5 of the symmetrical amplifier and that the subscriber's line is supplied by a voltage of amplitude $E-2u$, making the direct current circulate in the direction from terminal 7 to terminal 6.

The operation of the junctor will now be described, starting with the supply of direct current to the subscriber's line. For this, only the continuous components of the currents and voltages are considered. In order to meet the specifications, in normal conditions the junctor must behave like a feeding bridge with a resistance Ro equally divided between the two terminals of the supply source.

Since the junctor enables a voltage of amplitude $E-2u$ to be applied on the subscriber's line, it behaves like a feeding bridge with a total resistance of $Ro=2u/i$, i being the loop current, transverse in nature, provided by the junctor to the subscriber's line. This feeding bridge resistance is divided into two equal values $Ro/2 = u/i$ on the two terminals of the supply source.

If the values of the resistances 24 and 25 through which the weighted sum current J passes are called R and S, respectively, we get:

$$u = (R+S)J$$

and therefore:

$$Ro = 2(R+S)J/i. \qquad (1)$$

If the current entering the subscriber's line (through terminal 6 in the case of the figure) is called $i^+$ and the current leaving the subscriber's line (by terminal 7) is called $i^-$, the current J resulting from the weighted sum of the currents $i^+$ and $i^-$ with the respective weighting coefficients $\lambda^+$ and $\lambda^-$ is written thus:

$$J = \lambda^+ i^+ + \lambda^- i^-.$$

If the two weighting coefficients $\lambda^+$ and $\lambda^-$ have the same value $\lambda/2$, one can write:

$$J = \lambda/2(i^+ + i^-).$$

It is easy to appreciate that a weighted sum current J formed in this way depends only on the transverse current i supplied by the junctor to the subscriber's line and is dependent of a longitudinal current $i_e$ which can be created inopportunely in the subscriber's line. In fact, the currents $i^+$ and $i^-$ can be written respectively as follows:

$$\begin{cases} i^+ = i + i_e \\ i^- = i - i_e \end{cases}$$

The sum $i^+ + i^- = 2i$ depends only on the transverse current i and is independent of the longitudinal current $i_e$.

The current J formed by the weighted sum of the currents $i^+$ and $i^-$ with the same weighting coefficient $\lambda/2$ can therefore be written:

$$j = \lambda i. \qquad (2)$$

With this value of J, the total resistance Ro of the feeding bridge to which the junctor is equivalent is written according to formula (1) above:

$$Ro = 2\lambda(R+S). \qquad (3)$$

This feeding bridge resistance Ro is divided into two equal values $Ro/2 = \lambda(R+S)$ on the two terminals of the supply source. It should be noted that this is only true if the weighted sum current J is formed with the same weighting coefficient $\lambda/2$ for the currents $i^+$ and $i^-$. If this condition is fulfilled, formula (3) shows that by acting upon the coefficient $\lambda$ and/or the resistance R or S, one can regulate the feeding bridge resistance Ro of the junctor while still retaining perfect distribution of this resistance.

An explanation will now be given of how transmission of the speech signals takes place between the exchange and the subscriber's line, of the four-wire access to the exchange provided by the terminals 26, 27 and 31, and of the two-wire access to the subscriber's line provided by terminals 6 and 7. In this explanation, the various quantities used (voltages, currents, impedances etc.) refer only to the variable speech signals.

The first case to be considered is the transmission of the speech signals from the exchange to the subscriber's line, and it is assumed that no variable voltage is generated by the subscriber's station. The weighted sum current J is assumed always to be formed in the same way, with the same weighting coefficient $\lambda/2$ for the currents entering and leaving the subscriber's line. This weighted sum current J therefore always has the form $J = \lambda i$ and circulates via resistances 23 and 24, the high-value capacitor 29, and the low-impedance circuit of the exchange (not shown) which is branched between the input terminal 27 of the junctor and the earth terminal 26. With $e_c$ being the voltage coming from the exchange and applied between these last two terminals, and u being the voltage applied to the input 34 of the phase changer 35, and with R as the value of the resistance 24, one can write:

$$u = e_c + \lambda Ri.$$

Thanks to the phase splitting and switching circuit 35 the voltage $u_s$ obtained between these two terminals 6 and 7 of the subscriber's line is such that:

$$u_s = -2u.$$

If W is the impedance of the subscriber's line, this gives us:

$$u_s = Wi$$

From these formulae one can easily deduce the following:

$$u_s = -\frac{2W}{W + 2\lambda R} e_c$$

This last formula makes it apparent that for the speech signals the junctor behaves like an impedance Z such that:

$$Z = 2\lambda R. \quad (4)$$

This impedance Z is perfectly balanced with regard to ground if the weighted sum current J has the form $J = \lambda i$, and one can regulate its value by exercising influence on the coefficient $\lambda$ and/or the resistance R, without modifying its balancing with regard to ground.

If, in particular, one contrives to carry out the impedance adaptation between the line and the junctor, which is expressed by $W = 2\lambda R$, one obtains $u_s = -e_c$. The voltage $e_c$ applied to the four-wire input of the junctor is to be found entirely on the terminals of the subscriber's line.

Moreover, for this direction of transmission, one must check the possibility of the differential effect being produced, that is to say that no voltage must appear at the four-wire output of the junctor (between terminals 31 and 26) under the effect of the voltage $e_c$.

If the value of the resistance 23 is called Wo, the voltage $v_s$ at the four-wire output of the junctor can be written thus:

$$v_s = u + \lambda Wo\, i.$$

For the direction of transmission envisaged, from the formulae already given, we get:

$$u = -\frac{Wi}{2}$$

$$i = -\frac{2e_c}{W + 2\lambda R}$$

From this it can be deduced that the voltage $v_s$ for this direction of transmission can be written as follows:

$$v_s = \frac{2e_c}{W + 2\lambda R}\left(\frac{W}{2} - \lambda Wo\right).$$

This voltage is cancelled out whatever the voltage $e_c$, and the differential effect is realised perfectly if the resistance Wo which one can call balancing impedance is such that:

$$Wo = W/2\lambda.$$

The operation of the junctor for the other transmission direction, from the subscriber's line to the exchange, will now be examined. It is assumed that no voltage coming from the exchange is applied to the four-wire input of the junctor ($e_c = 0$) and that a voltage $v_a$ is generated in the subscriber's station. With the notations already given, one can then write:

$$u = R\, i$$

$$-u = Wi + v_a.$$

From this it is deduced that the current in the subscriber's line under the effect of the voltage $v_a$ can be written thus:

$$i = -\frac{v_a}{W + 2\lambda R}.$$

This expression still shows that the junctor behaves like an impedance $Z = 2\lambda R$.

From this it can easily be deduced that for the direction of transmission envisaged, the voltage collected at the four-wire output of the junctor is written thus:

$$v_s = -\frac{\lambda(R + Wo)}{W + 2\lambda R} v_a.$$

If the balancing impedance Wo is chosen in order to realise the differential effect and is therefore such that $Wo = W/2\lambda$, it is confirmed that $v_s = -v_a/2$. At the output of the four-wire access of the junctor one therefore collects half the voltage $v_a$ generated in the subscriber's station, which corresponds to a transmission without losses.

Finally, between the two-wire access of the junctor connected to the subscriber's line and the four-wire access connected to the exchange, one obtains a transmission without losses ($u_s = -e_c$, $v_s = -v_a/2$) at the same time as a perfect differential effect, by choosing the values of $\lambda$ and R in such a way that:

$$W = 2\lambda R$$

$$Wo = W/2\lambda.$$

With a subscriber junctor of the type just described, it has been seen that it is important for the weighted sum current J of the current $i^+$ entering the subscriber's line and of the current $i^-$ leaving the subscriber's line to be formed with weighting coefficients $\lambda^+$ and $\lambda^-$ of equal value $\lambda/2$. In this way, the resistance Ro of the feeding bridge to which the junctor is equivalent takes the form $Ro = 2\lambda(R + S)$ and remains equally divided between the terminals of the supply source, whatever the values given to $\lambda$, R and S, in order to obtain a particular value of Ro. Likewise in this way, the impedance Z of the junctor for the speech signals takes the form $Z = 2\lambda R$ and remains perfectly balanced with regard to ground, whatever the values given to $\lambda$ and R in order to obtain a particular value of Z. Moreover, as can be imagined, in this junctor it is very useful to be able to regulate the common value λ/2 of the two weighting coefficients λ+ and λ−.

The present invention includes a simple, practical device for forming the weighted sum current J while observing these requirements comprising two distinct controls, one for making the two weighting coefficients equal and the other for regulating their common value.

This device is made up of the circuits 16 and 19, the terminals 14 and 17 of which are linked to the supply terminals 47 and 48, respectively, of the symmetrical amplifier. Whatever the direction of the direct current in the subscriber's line, in the link 14 to 47 a current circulates which is practically equal to the current i+ entering the subscriber's line and in the link 17 to 48 a current circulates which is practically equal to the current i− leaving the subscriber's line.

The circuit 19 is a circuit known as a current mirror which comprises an input terminal 17 at which the current i− appears, a summing current terminal 18 linked to the negative supply terminal 3 and an output terminal 21. In the simple form shown, the current mirror 19 is made up of an npn transistor 49 and a diode 50, connected to terminals 17, 18 and 21 as shown in the figure. It is known that a current mirror provides at its output terminal 21 a current ki− proportional to the current i− at its input terminal 17, the coefficient k in the example shown depending only on the geometric characteristics of the transistor 49 and of the diode 50, if these are integrated on the same semiconductor substrate.

The current ki− is applied via terminal 20 of circuit 16 at one end of a voltage divider circuit made up of the two series resistances 51 and 52 having the values ρ and r. The other end of this voltage divider circuit is connected to the supply terminal 2. The junction 53 of resistances 51 and 52 is connected to the terminal 14 on which the i+ current appears. The voltage v between the extreme terminals of this voltage divider circuit can be written as follows:

$$v = r\,i^+ + (r+\rho)k\,i^-.$$

If the two resistances r and ρ of the voltage divider circuit are such that:

$$\frac{r}{r+\rho} = k \qquad (5)$$

the voltage v is then written thus:

$$v = r(i^+ + i^-). \qquad (6)$$

Therefore by regulating one of the resistances r and ρ so as to observe the relation (5), at the outermost terminals of the voltage divider circuit one obtains a voltage v proportional to the sum of the currents i+ and i−.

This voltage v is applied to the input of a voltage follower circuit which, in the form shown in FIG. 1, is made up of a pnp transistor 55 connected as an emitter-follower. Its base and its emitter are connected to the outermost terminals of the voltage divider circuit via a resistance 56, of value s, as far as the emitter is concerned. Ignoring the base-emitter voltage drop and the base current of the transistor 55, its collector current has the value of v/s. If relation (5) is respected, this collector current therefore has the form of r/s(i+ + i−), that is to say that it represents the weighted sum current J desired, with two equal weighting coefficients r/s.

The weighted sum current J can be written in the form indicated in formula (2) above, producing the transverse current i provided by the junctor:

$$J = \lambda i, \text{ where } \lambda = 2r/s. \qquad (7)$$

Finally, the circuit 16 which has just been described provides two independent means of control. By regulating the value ρ of the resistance 51 of the voltage divider circuit so as to satisfy relation (5), the weighting coefficients of currents i+ and i− are made equal. By regulating the value s of the resistance 56 of the voltage follower circuit, in accordance with formula (7) one regulates the value of the proportionality coefficient λ and therefore the amplitude of the weighted sum current J. The specialist will easily understand that the weighted sum current could be formed just as well with a current mirror 19 having its summing terminal linked to the supply terminal 2, receiving the current i+ and providing the current k i+, with circuit 16 connected to the supply terminal 3 and receiving the currents i− and k i+; these circuits 16 and 19 would then be constructed with complementary transistors to those shown in FIG. 1. The same remark is valid for the other forms of construction of these circuits 16 and 19 described below.

Figure 2:
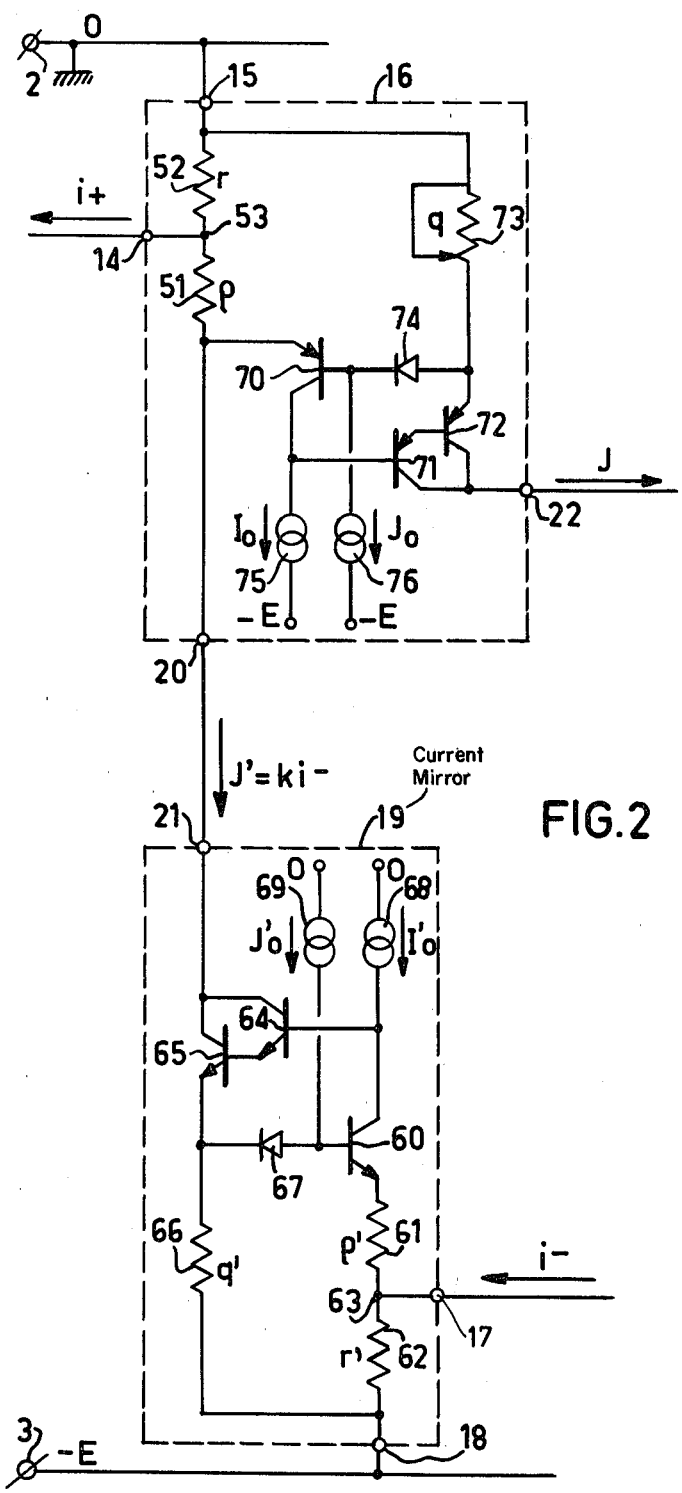
FIG. 2 represents the advantageous form of construction of the device for forming the weighted sum current.

FIG. 2 shows another form of construction of these circuits 16 and 19 in which these two circuits work together to form the weighted sum current J. These circuits comprise elements identical to those in FIG. 1 and referenced in the same way and are linked to the other elements of the junctor in the same way. In FIG. 2, the circuit 19 functions as a current mirror whose current ratio k can be modified, while the voltage follower circuit incorporated in circuit 16 is constructed so as to offer a more linear characteristic.

Circuit 19 comprises an npn transistor 60, the emitter of which is linked to the negative supply terminal 3 via the two series resistances 61 and 62 of respective values ρ' and r'. The junction 63 of these two resistances is connected to the input terminal 17 of circuit 19 to which the current i− is applied. The collector of the transistor 60 is connected to the base of an npn transistor 64. The emitter of the transistor 64 is connected to the base of an npn transistor 65. The collectors of the transistors 64 and 65 are interconnected and connected to the output terminal 21 of circuit 19. The transistors 64 and 65 connected in this way together form a composite transistor with a very high gain. The emitter of transistor 65 is connected on the one hand to the negative supply terminal 3 via the resistance 66 of value q', and on the other hand to the base of the transistor 60 via the diode 67 connected in the non-conducting direction. Finally, a current source 68 injects a current I'$_o$ at the junction of the collector of transistor 60 and the base of transistor 64 and a current source 69 injects a current J'$_o$ at the junction of the base of transistor 60 and the diode 67.

Ignoring the base currents of transistors 60 and 64, it can be seen that the current I'$_o$ passes through the resistance ρ' and the current I'$_o$+i− passes through the resistance r'. Making the same approximation and calling the current appearing at terminal 21 J', it is seen that the current J'+J'$_o$ passes through the resistance q'. The voltage drops across diode 67 and the base-emitter diode of transistor 60 being very close to each other, the voltages at the emitters of transistors 60 and 65 are practically the same, which is reflected in the following relations:

$$\rho' I'_o + r'(I'_o + i^-) = q'(J' + J'_o)$$

or $$I'_o(r' + \rho') + r'i^- = q'J' + q'J'_o.$$

Currents $I'_o$ and $J'_o$ are currents with weak polarisation (of the order of several tens of $\mu A$). If one contrives to make the voltage drops obtained by these polarisation currents equal, i.e. so that $I'_o(r'+\rho')=q'J'_o$, one gets:

$$J' = r'/q' i^-.$$

With the help of the circuit 19 which has just been described, one can therefore make a current J' appear at the output terminal 21 which is proportional to the current $i^-$ appearing at its input terminal 17. This circuit 19 therefore behaves like a current mirror with a ratio $k = r'/q'$, fixed by the ratio of two resistances.

At its input, circuit 16 comprises the same voltage divider circuit as in FIG. 1. This voltage divider circuit formed by the series resistances 51 and 52, with the values $\rho$ and r, is connected in the same way as in FIG. 1, with regard to terminals 14, 15 and 20. The current $J' = k\ i^-$ provided by the current mirror 19 ($k = r'/q'$) therefore appears at the end connected to terminal 20 and at its intermediate terminal 53 the current $i^+$ appears. If the ratio of resistances $r/r + \rho$ is adjusted to make it equal to the current ratio k, in accordance with relation (5) above, the voltage v at the outermost terminals of the voltage divider is such that $v = r(i^+ + i^-)$, in accordance with relation (6) above.

The rest of circuit 16 is intended to fulfil the function of voltage follower circuit in order to supply at the output terminal 22 a current proportional to the voltage v, that is to say the desired weighted sum current J, with a variable level. For that, a transistor 70 is used, whose emitter is connected to the resistance 51 and whose collector is connected to the base of a transistor 71. The emitter of transistor 71 is connected to the base of a transistor 72. The collectors of transistors 71 and 72 are interconnected and linked to the output terminal 22 of circuit 16. The transistors 71 and 72 mounted in this way together form a composite transistor with a very high gain. The emitter of transistor 72 is connected on the one hand to the positive supply terminal 2 by way of the resistance 73 of value q, and on the other hand to the base of transistor 70 via the diode 74 connected in the direction indicated. Finally the current source 75 injects a current $I_o$ at the junction of the collector of transistor 70 and the base of transistor 71, and the current source 76 injects a current $J_o$ at the junction of the base of transistor 70 and the diode 74.

The base currents of the different transistors in the circuit have been ignored in the following calculation of the output current J of circuit 16. The voltage between the outer terminals of the voltage divider 51, 52 which was $v = r(i^+ + i^-)$ in the absence of the other elements of circuit 16 becomes:

$$v' = r(i^+ + i^-) + (r+\rho)I_o.$$

The voltage between the terminals of the resistance q through which the current $J + J_o$ passes is practically equal to v'. Therefore:

$$v' = q(J + J_o).$$

From these two expressions of v' it can easily be deduced that:

$$J = \frac{r}{q}(i^+ + i^-) + \left[\frac{r+\rho}{q} I_o - J_o\right].$$

The currents $I_o$ and $J_o$ are very small polarisation currents and the difference current which appears in the term between square brackets in the above formula is very small and can be ignored.

In this case the current J can be written as:

$$J = r/q(i^+ + i^-).$$

and it can be put in the form which gives the transverse current i supplied by the junctor:

$$J = \lambda i \text{ where } \lambda = 2r/q. \tag{8}$$

Improved linearity of the follower circuit is obtained with the circuit 16 in FIG. 2 which has just been described, compared with the corresponding circuit in FIG. 1. In the same way, the coefficient $\lambda$ can be adjusted by modifying the value q of a resistance 73.

According to formulae (3) and (4) above, the feeding bridge resistance Ro of the junctor and the impedance Z of the junctor for the speech currents can be adjusted by modifying the coefficient $\lambda$. Now with the embodiment of the device forming the weighted sum current $J = \lambda i$ which has just been described with reference to FIG. 2, one can very simply obtain different and separately variable values of $\lambda$ for the direct current and for the variable conversation currents so as to obtain independent adjustments for the resistance Ro and for the impedance Z.

Figure 3:
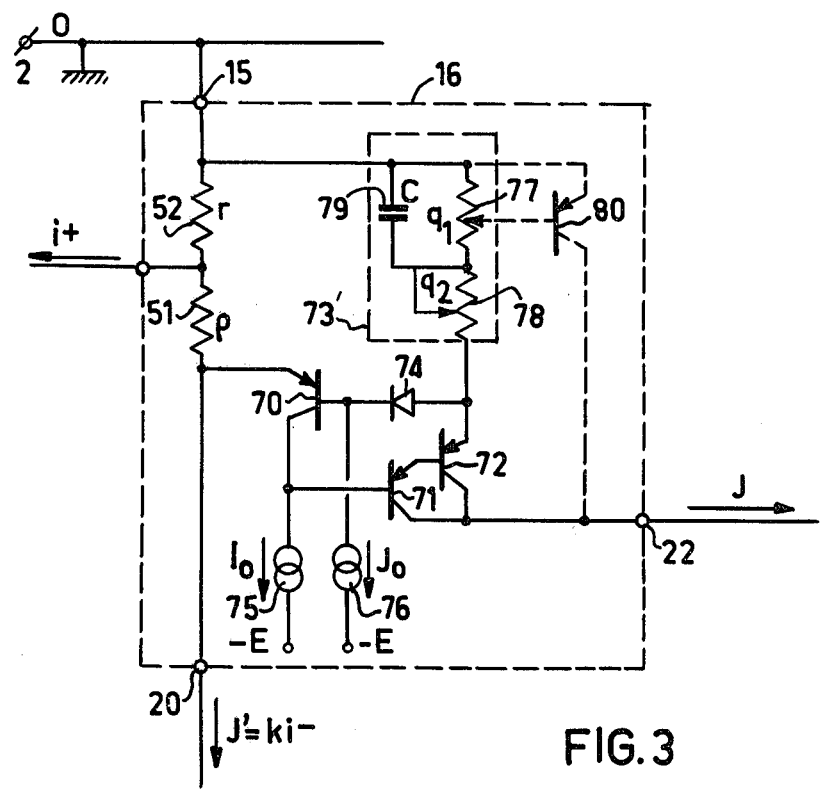
FIG. 3 represents a form of construction of a voltage follower circuit used for regulating the amplitude of the weighted sum current and permitting a reduction of the current in the subscriber's line in the case of a wrong call and limitation of this current in the case of a short line.

This result can be obtained by modifying the circuit 16 as indicated in FIG. 3. This modified circuit 16 comprises all the elements of the corresponding circuit in FIG. 2 but has the impedance 73' realised in the following way. It is formed by two resistances in series 77 and 78, of respective values $q_1$ and $q_2$, resistance 77 being shunted by a capacitor 79 of capacitance C chosen to practically constitute a short-circuit for the variable speech currents. Applying formula (8) it can be seen that the coefficient $\lambda$ takes the value $2r/(q_1 + q_2)$ for the direct current and the value $2r/q_2$ for the variable speech currents. The values of Ro and Z given by formulae (3) and (4) can consequently be written thus:

$$Ro = \frac{4r}{q_1 + q_2}(R + S). \tag{9}$$

$$Z = \frac{4r}{q_2} R. \tag{10}$$

From these last two formulae it emerges quite clearly that if the resistance $q_2$ is adjusted to obtain the desired impedance value Z for the speech currents, one can modify the resistance $q_1$ to obtain a desired value for the feeding bridge resistance Ro.

This possibility can be used to perform in a particularly simple way a function which is generally required to a junctor. This function consists in increasing the feeding bridge resistance Ro in order to decrease the loop current when the exchange has detected a wrong call resulting for instance from prolonged inadvertent unhooking of the subscriber's receiver.

In this case, at an order originating from the exchange, the resistance $q_1$ can be switched from its normal value to a much lower value corresponding to a much higher value of Ro.

By adding to the circuit 16 shown in FIG. 3 a transistor 80, shown as a broken line, one can moreover limit the loop current to a given value in the case of a very short line. This transistor 80 is of the pnp type, has its emitter connected to the positive supply terminal 2 and its collector connected to the output terminal 22 of circuit 16 while the resistance 77 is replaced by a potentiometer, the slider of which is connected to the base of the transistor 80. As long as the voltage between the base and the emitter of transistor 80 is less than the threshold voltage (of the order of 0.6 V), transistor 80 does not conduct and the junctor behaves as explained above; in particular, the loop current is limited by the feeding bridge resistance Ro of the junctor given by formula (9). In accordance with what has already been explained, it amounts to the same thing to say that the loop current i results from application to the subscriber's line of the voltage E−2u, u being the voltage drop produced by the circulation of the current $J = \lambda i$ across the two series resistances 24 and 25 of values R and S. Beyond a certain value of the loop current i, the circulation of the current $J = \lambda i$ across the resistance 77 produces sufficient voltage between the base and the emitter of transistor 80 to make it conduct. The current supplied by transistor 80 tends to cause an increase in the voltage drop u, a decrease in the voltage E−2u applied to the subscriber's line and therefore a decrease in the loop current i. Finally, when the subscriber's line becomes too short, the loop current stabilises at a value $i_o$ which can be adjusted by moving the slider of the potentiometer 77. This adjustment does not in any way affect the characteristics of the junctor for the lines of normal length.

Everything which has just been described and explained with regard to circuit 16 of FIG. 3 also applies to the circuit 16 constructed in accordance with FIG. 1. It is sufficient to modify the impedance 56 of value s, as the resistance 73 of value q has been modified.

Another function which a junctor must fulfill is to transmit a metering signal to the subscriber at the same time as the speech signals. It is known that this metering signal is made up of trains of oscillations at a frequency of for instance 12 kHz, the amplitude of these oscillations being relatively small (of the order of 2 volts), the repetition rate and the duration of the trains being determined by the exchange. One must of course ensure that the metering signal is only transmitted in the direction of the subscriber's line and does not return to the exchange. The junctor shown in FIG. 1 lends itself well to the realisation of this function of transmitting the metering signal, through the addition of several very simple circuits which are described in FIG. 4.

Figure 4:
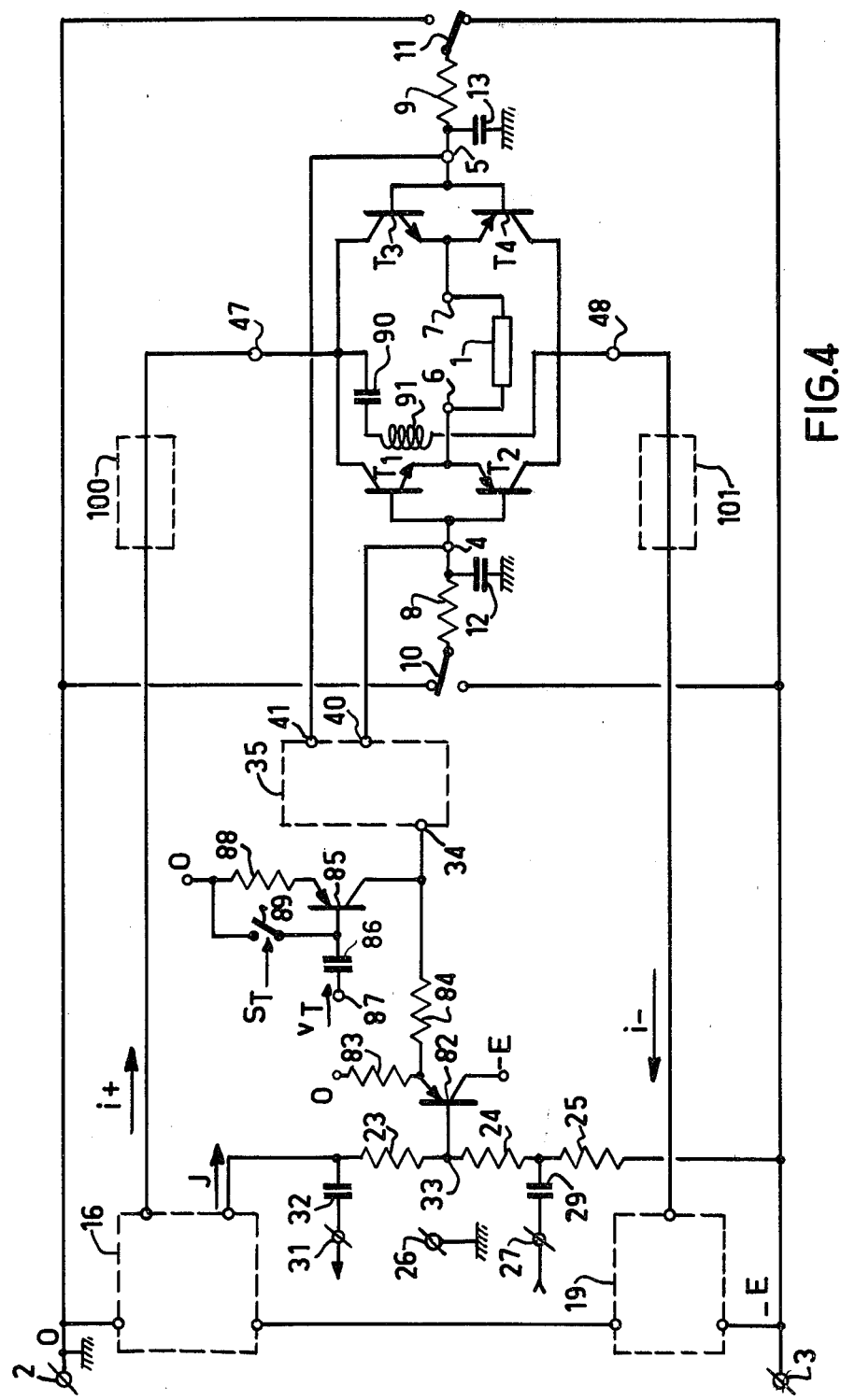
FIG. 4 represents a junctor in accordance with the invention, provided with means for generating a metering signal on the subscriber's line.

In FIG. 4, the same circuits are shown as in FIG. 1, provided with the same references, but with circuits 16, 19 and 35 not being shown in detail, in order to simplify the figure. In addition, the junctor comprises a pnp transistor 82 whose base is linked to the junction 33 and whose emitter is linked to one terminal of a resistance 83 having its other terminal at the potential zero and whose collector is at the potential −E. The emitter of transistor 82 is connected by way of resistance 84 to the input 34 of the phase splitting and switching circuit 35. The transistor 82 connected in this way functions as an emitter-follower and transmits to the input 34 of circuit 35 the voltage present at terminal 33 and applied to its base.

The voltage transmitted to the input 34 is modulated at 12 kHz in the course of each train of oscillations of the metering signal by means of the pnp transistor 85. The base of this transistor is linked via a capacitor 86, to a terminal 87 at which a permanent sinusoidal signal $v_T$ with the frequency of 12 kHz appears. The emitter of transistor 85 is connected to a resistance 88, the other terminal of which is at the zero potential. The collector of transistor 85 is connected to the input terminal 34 of circuit 35. Finally, the base of transistor 85 is connected to the zero potential via a switch 89 controlled by the signal $S_T$ coming from the exchange. This signal $S_T$ is such that the switch 89 is open for the anticipated duration of each train of oscillations at 12 kHz, and during this time the voltage transmitted to the input 34 of circuit 35 is seen to be modulated to 12 kHz, with an amplitude which can easily be adjusted.

In response to the variable component u of the voltage applied to its input 34, the circuit 35 provides at its two output terminals 40 and 41 the two voltages in opposite phase −u and +u, which between terminals 6 and 7 of the subscriber's line give rise to the variable voltage 2u resulting from the speech signals and from the 12 kHz modulation obtained with the help of transistor 85. The desired amplitude for the oscillations of the 12 kHz metering signal on the subscriber's line (for example 2 volts peak-to-peak) can easily be obtained by modifying the level of the signal $v_T$ applied at the base of transistor 85.

It is necessary to prevent any 12 kHz oscillation from appearing at the output 31 of the junctor connected to the exchange. For this relatively high frequency, it is not enough to count entirely on the differential effect of the junctor realised as explained with the help of the balancing resistance 23, for this balancing is only valid for the relatively low frequencies of speech currents. It should be noted first of all that the transistor 82 plays the role of a separator circuit which prevents any direct transmission of the 12 kHz modulation from transistor 85 towards the resistance 23 and the output circuit 31. Moreover, in order to prevent the 12 kHz component of the voltage 2u at the terminals of the subscriber's line from producing a component at this frequency in the weighted sum current J crossing the resistance 23, a series resonant circuit formed by a capacitor 90 and the inductance coil 91 and tuned to the 12 kHz frequency is connected between the supply terminals 47 and 48 of the symmetrical amplifier. In this way, the currents $i^+$ and $i^-$ applied at the terminals 14 and 17 of circuits 16 and 19 to form the weighted sum current J are stripped of any 12 kHz component.

In the subscriber junctor as specified in the invention, it is moreover advantageous to place in series on the two supply terminals 47 and 48 of the symmetrical power amplifier two two port networks 100 and 101 which are represented in FIG. 4 by rectangles drawn in broken lines. The currents flowing through the collectors of the transistors T1, T2, T3 and T4 also flow through the two port networks 100 and 101. The currents flowing through said collector are aside from the base currents of these transistors equal to the transverse line current i circulating in the subscriber line. The aim of these two port networks 100 and 101 is to create identical voltage drops to limit the power dissipated in the transistors of the symmetrical amplifier and thus to facilitate their integration, while still ensuring correct operation of these transistors throughout the range of normal currents in the subscriber's line. They are also intended to ensure effective protection of these transistors in the case of a short-circuit on the subscriber's line. First of all, an explanation will be given of the ideal characteristic to be obtained for the voltage drop y across two port network 100 or 101 as a function of the current i passing through it, in the normal range of this current. For example, let us suppose that it is two port network 100 which is involved and that the current i flowing through it is the collector current of transistor $T_1$. It has been shown that, due to the two degenerative feedback voltages $-u$ and $+u$ applied to the two input terminals 4 and 5, respectively, of the symmetrical amplifier, the junctor is equivalent to a feeding bridge of total resistance Ro, given by formula (3) and equally divided into two resistances Ro/2 at the two terminals of the supply source. The voltage $-u$ at terminal 4 can therefore be written $-u = -Ro/2i$. Ignoring the base-emitter voltage drop of transistor $T_1$, this voltage $-u$ is found on the emitter of this transistor $T_1$. If y is the voltage drop across two port network 100, the collector voltage of the transistor $T_1$ is $-y$. The difference in potential between the collector and the emitter of transistor $T_1$ is therefore $-y-(-u) = -y+u = -y+Ro/2i$.

So that the transistor $T_1$ is never saturated, it is sufficient for the difference in potential between its collector and its emitter to be equal to a value $v_o$ greater than its saturation voltage, which is written thus:

$$-y + \frac{Ro}{2} i = v_o \qquad (11)$$

or $$y = \frac{Ro}{2} i - v_o.$$

For the range of normal currents i in the subscriber's line, this formula (11) therefore indicates the voltage drop y to be realised in two port network 100 as a function of the current i which crosses it, in order to obtain a constant potential difference $v_o$ between the collector and emitter of transistor $T_1$. If $v_o$ is small (2 V for example) it is clear that the power dissipated in the transistor $T_1$ will remain limited for the entire range of normal currents i (for example from 20 mA to 80 mA).

Figure 5:
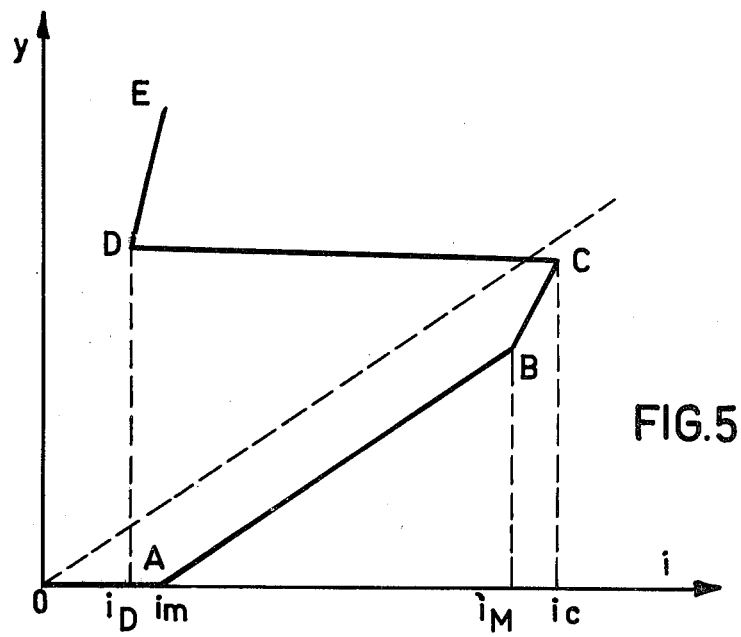
FIG. 5 shows the ideal voltage-current characteristic of a two part network which it is advantageous to place in series on the supply terminals of a symmetrical power amplifier in the junctor.

On the graph in FIG. 5, the curve shown as an unbroken line is the ideal characteristic of the voltage drop y across two port network 100 or 101 as a function of the current i crossing it. The segment AB on this curve corresponds to the equation in formula (11). This segment is parallel to the straight broken line from equation $u = Ro/2i$ and differs in ordinates with regard to this straight line by the quantity $-v_o$. The normal currents in the subscriber's line are included between the current $i_m = 2v_o/R$ corresponding to point A and the current $i_M$ corresponding to point B. For currents i going from O to $i_m$, the characteristic $y = f(i)$ is represented by the segment OA for which $y = 0$. For currents i exceeding the maximum value $i_M$ (which can happen in the case of a short-circuit on the subscriber's line), the characteristic $y = f(i)$ is represented approximately by the BCDE part of the curve. In the first part, BC, the voltage drop y rapidly increases. In the second part CD, a balancing is produced in the two port network which makes it possible to obtain the characteristic represented by the third part DE, for which the resistance of the two port network becomes very high and the current i is limited to low values.

Figure 6:
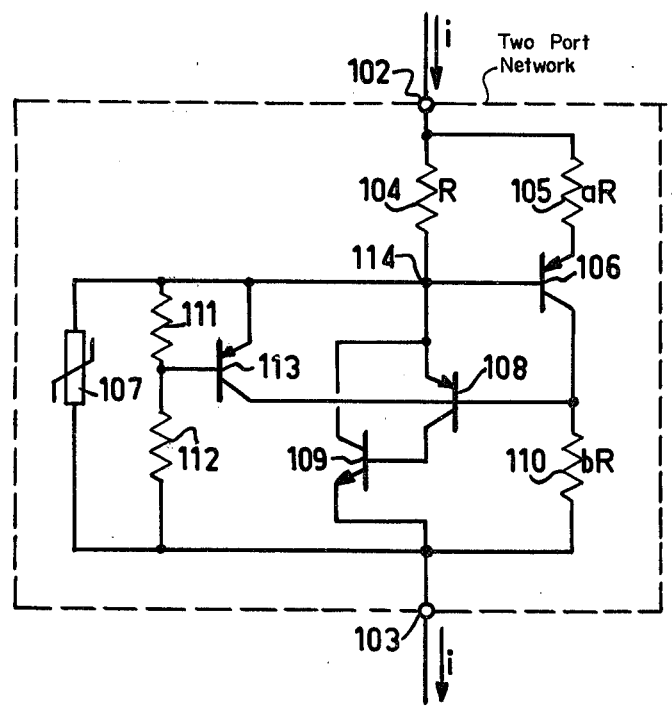
FIG. 6 is a diagram of a form of construction of these two part networks.

A characteristic $y = f(i)$ approaching the ideal form shown in FIG. 5 can be obtained with the help of two port network 100 or 101, of the form shown in FIG. 6.

The two port network shown in FIG. 6 has terminals 102 and 103 through which the line current i flows. Essentially it consists of a resistance 104 of low value R in which a notable fraction of the current i flows and a bypass circuit comprising a resistance 105 of relatively high value aR in series with the emitter-base junction of a pnp transistor 106. The current circulating in the resistance 104 can flow from junction 114 of the resistance 105 and the base of transistor 106 to terminal 103 via several paths, the first being constituted by the element 107 which is a non-linear resistance whose characteristics will be defined hereinafter, the second being constituted by the emitter-collector path of a composite transistor of the pnp type, formed by the interconnection of two transistors 108 and 109, one being of the pnp type and the other of the npn type and the third being constituted by the collector of transistor 106 and the resistance 110 of value bR. As will be seen later on, the paths presented by the bridge of the resistances 111, 112 and the transistor 113 present very high impedances compared with those of the first three paths.

The operation of this two port network in the range of line currents i where $0 < i < i_m$ will be examined first. The current i circulates entirely in the resistance 104. The voltage drop Ri created at its terminals is not sufficient to make the transistor 106 conduct. The low base current of transistor 108 flows via the resistance 110 towards the terminal 103 and is sufficient to make the composite transistor 108, 109 conduct. The voltage drop between junction 114 and terminal 103 is very small and if one ignores the voltage drop created at the terminals of resistance 110 by the very low base current of transistor 108, is practically equal to the voltage of the emitter-base diode of this transistor. Consequently the current circulating in the non-linear resistance 107 is low and practically all the current i passes through the emitter-collector junction of the composite transistor 108, 109. The impedance of the two port network between its terminals 102, 103 is therefore reduced practically to the very low value of the resistance 104 so that for i currents where $0 < i < i_m$, the characteristic $y = f(i)$ of the two port network is very close to the OA segment of the curve shown in FIG. 5.

The operation of the two port network in the range where the current i increases from $i_m$ to $i_M$ will now be examined. For $i = i_m$ the voltage drop $Ri_m$ at the terminals of the resistance 104 is just sufficient to make transistor 106 a conductor. In practice the value of $i_m$ will be chosen so that $Ri_m = 0.7$ V if the transistor 106 is a silicon transistor. A fraction 1/a of the curret $(i - i_m)$ flows in the transistor 106, creating at the terminals of the resistance 110 a voltage drop of value $b/a \times R(i - i_m)$. The voltage drop y at the terminals 102, 103 of the two port network is therefore:

$$y = Ri + b/aR(i - i_m)$$

where i increases from $i_m$ to $i_M$, the corresponding characteristic $y = f(i)$ is a portion of a sloping straight line $(b/a + 1)R$, which can be made very close to the AB segment on the curve in FIG. 5 by choosing the values aR and bR of resistances 105 and 106 appropriately. As already explained, it is desirable to choose this slope so that it is close to Ro/2.

When the current i increases, the voltage between terminals 114 and 103 increases, an increasingly significant fraction of this current i crosses the resistance 107 while the proportion of the current i passing into the emitter-collector junction of the composite transistor 108, 109 decreases. In fact, ignoring the incidence of the current flowing through transistor 106, the current crossing resistance 107 of value Q is written thus:

$$i_Q = b/aR/Q(i - i_m),$$

and the current crossing the composite transistor is $(i - i_Q)$.

Finally, the operation of the two port network for increasing high currents which are greater than $i_M$ will be examined. At point B on the curve in FIG. 5, for which $i = i_M$, the current $i - i_Q$ is reduced to zero. This means that the composite transistor 108, 109 becomes blocked, which is only possible if the transistor 106 becomes saturated. At this moment practically all the current i passes into the resistance 107 of value Q and the characteristic $y = f(i)$ is represented on the curve of FIG. 5 by the segment CD with a slope of value Q.

As already indicated, the element 107 is chosen judiciously so as to behave like a non-linear resistance. This element 107 can for instance be a thermistor with direct heating which is triggered when a current greater than a knee value $i_c$ is applied. When the current i crossing the thermistor 107 reaches the value $i_c$ corresponding to the point C on the curve in FIG. 5, the thermistor is tripped and its resistance passes from the aforementioned value Q to a very high value Q'. At the same time, the current i passes abruptly from the value $i_c$ to the value $i_D = Q/Q' i_c$, which is defined by point D on the curve in FIG. 5. Then when the voltage at terminals 102, 103 of the two port network increases, this two port network behaves like a simple resistance with a very high value (Q' + R), which corresponds to the segment DE on the curve of FIG. 5.

The role of the circuit made up of the bridge of resistances 111, 112 and of the transistor 113 is to keep the composite transistor 108, 109 blocked when the value of the current i suddenly decreases from $i_c$ to $i_D$ following tripping of the thermistor 107. For a current i equal to $i_c$ and practically corresponding to the voltage $y_c$ at the terminals of the bridge of resistances 111, 112, it is ensured that the voltage at the terminals of the resistance 111 is sufficient to saturate transistor 113, causing the emitter-base junction of transistor 108 to be blocked.

The functioning of the junctor forming the subject of the invention has until now been described in the case where the output impedances of the symmetrical power amplifier have a value which is practically zero. Though less advantageous, in this junctor one can also use a symmetrical power amplifier having output impedances which are equal but not zero. In the following, the common value of these output impedances is called X.

To explain the operation of the junctor in the case where X is not equal to 0, one can carry out the same calculations as those given above in the case where X = 0. In particular, for the transmission of the variable voltage $e_c$ coming from the exchange towards the subscriber's line the following results may be obtained in which the terms used have the meanings already specified.

The voltage $u_S$ collected at terminals 6 and 7 of the subscriber's line can be written thus:

$$u_S = -\frac{2W}{W + 2\lambda R + 2X} e_c.$$

For the variable signals the junctor behaves like an impedance $$Z = 2\lambda R + 2X.$$

The impedance adaptation between the subscriber's line and the junctor is expressed by $W = 2\lambda R + 2X$, in which case one gets $u_S = -e_c$.

For the same direction of transmission, the voltage $v_S$ obtained at the four-wire output of the junctor can be written:

$$v_S = \frac{2e_c}{W + 2\lambda R + 2X}\left(\frac{W}{2} + \lambda W_o\right).$$

The differential effect is realised perfectly if the balancing impedance $W_o$ is such that:

$$W_o = W/2\lambda + X/\lambda.$$

For the transmission towards the exchange of the variable voltage $v_a$ generated in the subscriber's station, the following results are obtained: The voltage $v_S$ collected at the four-wire output of the junctor is written:

$$v_S = -\frac{\lambda(R + W_o)}{W + 2\lambda R + 2X} v_a.$$

If the balancing impedance $W_o$ is chosen in order to realise the differential effect, one has: $v_S = -v_a/2$.

Finally, between the two-wire access of the junctor connected to the subscriber's line and the four-wire access connected to the exchange, whatever the value of the impedance X, one obtains a transmission without losses ($u_S = -e_c$, $v_S = -v_a/2$) at the same time as a perfect differential effect, by choosing the values of $\lambda$ and R so that:

$$W = 2\lambda R + 2X$$

$$W_o = W/2\lambda + W/\lambda.$$

In the junctor specified in the invention, it is nevertheless preferable to use a symmetrical power amplifier having the lowest output impedances X possible, as the transverse current flowing in the subscriber's line causes power to be dissipated there as pure loss. Moreover, in the presence of induced longitudinal currents, the potentials of the output terminals of the junctor undergo displacement equal to $Xi_e$, $i_e$ being the common value of the longitudinal currents in each wire of the subscriber's line. In the case where $X \neq 0$ it is therefore necessary to dimension the symmetrical amplifier in such a way that it operates without becoming saturated, notwithstanding these parasitic shifts of potential.

Figure 7A:
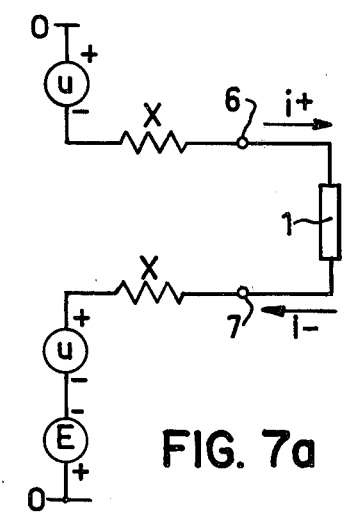
FIGS. 7a and 7b represent two equivalent structures of a junctor according to the invention, deduced by duality.
Figure 7B:
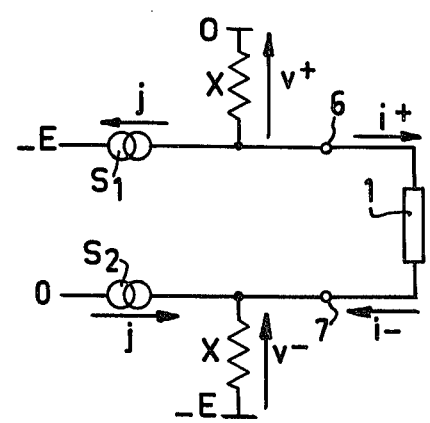

Finally, the junctor of the invention can be realised in other forms equivalent to that described so far. It is in fact well-known by specialists in the theory of electrical networks that the application of the theorems of Thévenin and of Norton make it possible to find, from a given structure, equivalent structures deduced by duality. FIGS. 7a and 7b represent one application of these equivalences of structure, between the structure described so far, which corresponds to FIG. 7a, and a structure deduced by duality, which corresponds to FIG. 7b.

In FIG. 7a, the subscriber's line 1 is connected between the output terminals 6 and 7 of the junctor. The symmetrical power amplifier is represented at the output terminal 6 by the equivalence deduced from the theorem of Thévenin, namely a voltage source $-u$ in series with the output impedance X of the junctor, and at output terminal 7 by the voltage sources $-E$ and $+u$ in series with the output impedance X. As previously, the voltage u is the voltage applied to input 34 of circuit 35 and has the following value:

$$u = \lambda/2 \, z \, (i^+ + i^-).$$

z is the load impedance through which the weighted sum current flows and can have a different value for the direct current and for the variable currents.

By applying Norton's theorem, one obtains the structure shown in FIG. 7b, which is equivalent to that of FIG. 7a. FIG. 7b shows two current sources $S_1$ and $S_2$ forming an injector amplifier with a current J operating in a symmetrical fashion and supplying the terminals of the subscriber's line 1, in parallel with the two impedances X connected to the two terminals of the supply source, O and $-E$, respectively; at the terminals of these two impedances X, the respective voltages $v^+$ and $v^-$ are measured. The value of the current J injected by the current sources $S_1$ and $S_2$ is deduced from the voltage u used in the equivalence structure of FIG. 7a by means of the relation:

$$j = u/X.$$

Using the value of u given above and bringing in the voltages $v^+$ and $v^-$, one can show that:

$$j = G(v^+ + v^-)$$

where $$G = \frac{\lambda z}{2X(\lambda z + X)}.$$

FIG. 7b, which is functionally equivalent to FIG. 7a, likewise makes it possible to create in the junctor an impedance which is balanced in relation to ground and of a value $1/G$ which can be regulated by modifying the values of $\lambda$ and/or z.

FIG. 7b nevertheless has certain drawbacks which makes its realisation not very practical. Thus in order to reverse the direction of the current in the subscriber's line one must not only change the direction of the current j supplied by the current sources $S_1$ and $S_2$, but one must also switch the two impedances X, one from the supply terminal O to the supply terminal $-E$, and the other from the terminal $-E$ to the terminal O. This leads to complicated switchings. Moreover, with FIG. 7b it is not practically possible to operate with an output impedance $X = 0$, for this would lead to current values j which would have to be infinitely large. In the presence of induced longitudinal currents of value $i_e$, with this structure one therefore necessarily has shifts of potential $Xi_e$ at terminals 6 and 7 of the junctor. The symmetrical amplifier which injects current j must therefore be able to withstand variations in output voltage at its terminals, uselessly high and due to these shifts of potential, without becoming saturated.

What is claimed is:

1. A subscriber junctor having a symmetrical power amplifier provided with two supply terminals for connection to a d.c. power supply, and two output terminals for connection to the two conductors of a subscriber's line, said junctor having a characteristic feeding bridge resistance ($R_o$) between the two terminals of the supply and being connectible to a telephone exchange, comprising:

means for forming a weighted sum current of the currents entering and leaving the subscriber's line, a load impedance, means for phase splitting and switching to form first and second voltages in phase and in phase opposition respectively with the voltage at the terminals of said load impedance through which the said weighted sum current flows and for applying said two voltages as negative feedback voltages to the two input terminals of the amplifier, a current mirror for forming said weighted sum current, the summing terminal and input terminal of which are linked to a terminal of the d.c. power supply and to the corresponding supply terminal of said symmetrical power amplifier respectively, a voltage divider circuit, the output terminal of said current mirror being connected to one end of said voltage divider circuit, the other end and an intermediate terminal of said current miror being connected to the other terminal of said d.c. power supply and to the corresponding supply terminal of said amplifier respectively, the voltage ratio of said voltage divider circuit being adjusted so as to be substantially equal to the current ratio of said current mirror, and a voltage follower circuit, the voltage at the ends of said voltage divider circuit being applied to said voltage follower circuit which is regulated so as to provide said weighted sum current having the desired amplitude.

2. A subscriber junctor as claimed in claim 1 comprising:

an adjustable resistance connected to said voltage divider circuit said adjustable resistance of said voltage divider circuit being used to regulate the amplitude of the weighted sum current and being divided into two resistances, one of which is decoupled by a capacitor whose impedance value is very low for the speech currents, the value of the feeding bridge resistance of the junctor being regulated by means of the decoupled resistance without modifying the impedance of the junctor for the speech currents.

3. A subscriber junctor as claimed in claim 1, in which said current mirror comprises a first transistor, the emitter of which is connected to its summing terminal via a first and a second resistance in series, the junction of the first and second resistances being connected to the input terminal of the current mirror, whose collector is connected to a current source and whose base is connected to the summing terminal of the current mirror via the series connection of a diode and a third resistance, the said series connection being connected to another current source, the said current mirror comprising a second transistor, the emitter of which is connected to the common terminal between the said diode and the said third resistance, the collector of the second transistor being connected to the output terminal of the current mirror and the base of the second transistor being connected to the collector of the first transistor.

4. A subscriber junctor as claimed in one of claims 1 or 3, in which said voltage follower circuit is realised by means of a first transistor, the emitter of which is connected to one end of said voltage divider circuit, the collector of which is connected to a current source, and the base of which is connected to the other end of said voltage divider circuit via the series connection of a diode and an adjustable resistance, the said series connection being connected to another current source, the said voltage follower circuit comprising a second transistor whose base is connected to the collector of the first transistor, whose emitter is connected to the junction between the said diode and the said adjustable resistance and whose collector provides the said weighted sum current with an amplitude which is regulated by means of the said adjustable resistance.

5. A subscriber junctor as claimed in claim 2, in which, when a wrong call on the part of the subscriber is detected in said exchange, the value of the said resistance decoupled by a capacitor is automatically reduced in order to reduce the direct current in the subscriber's line.

6. A subscriber junctor as claimed in one of claims 2 or 5, in which, in order to limit the direct current supplied by the junctor to the subscriber's line, a threshold circuit is used which receives at its input at least a fraction of the voltage at the terminals of the said resistance decoupled by a capacitor and which, in the case of the threshold being exceeded, supplies a current which is added to the weighted sum current.

7. A subscriber junctor as claimed in claim 6, in which the said threshold circuit comprises a transistor receiving between its base and its emitter the said voltage fraction and supplying through its collector the said current which is added to the weighted sum current.

8. A subscriber junctor as claimed in claim 1 for ensuring four-wire coupling between the subscriber's line and a telephone exchange, in which the weighted sum current passes through a circuit formed by three impedances in series, the input of this circuit being connected to the output of the junctor, the junction between the first impedance and the second impedance being linked to the input of the said means for phase splitting and switching, and the junction between the second impedance and the third impedance being connected to the input of the junctor.

9. A subscriber junctor as claimed in claim 8, in which the first impedance is adjusted to produce the differential effect, whereby, no voltage will be allowed to appear at the form-wire output of the junctor.

10. A subscriber junctor as claimed in claim 1, which comprises:

a separator circuit which transmits the voltage present at the terminals of said load impedance towards the input of the said means for phase splitting and switching, means for supplying the subscriber's line with the oscillation trains of a metering signal, means for modulating the voltage applied to said input during said oscillation trains of said metering signal by means of a signal having the frequency of the said oscillations, and means for filtering practically every component at this frequency in the weighted sum current.

11. A subscriber junctor as claimed in claim 10, in which the said means for filtering combine a series resonant circuit tuned to the frequency of said oscillation train of said metering signal connected between the two supply terminals of the symmetrical power amplifier.

12. A subscriber junctor as claimed in claim 1 in which two identical two port networks are connected respectively in series with the two supply terminals of the symmetrical power amplifier so as to conduct the current in the subscriber's line, each two port network being an active circuit arranged so that the two port network behaves substantially like an impedance of low value for a current increasing from zero to the minimum value $i_m$ of the normal current in the subscriber's line, like an impedance of specific value for the current variations occurring between the minimum value $i_m$ and the maximum value $i_M$ of the normal current in the subscriber's line, and finally the said active circuit contains a balancing element which, when the current crossing the two port network reaches via increasing values a value exceeding the said value $i_M$, brings the impedance of the two port network to a high value.

13. A subscriber junctor as claimed in claim 12, in which the said impedance for the current variations between $i_m$ and $i_M$ has a value substantially equal to half the value of the feeding bridge resistance of the junctor.

* * * * *

UNITED STATES PATENT AND TRADEMARK OFFICE
CERTIFICATE OF CORRECTION

PATENT NO. : 4,356,354
DATED : October 26, 1982
INVENTOR(S) : GILBERT M.M. FERRIEU It is certified that error appears in the above—identified patent and that said Letters Patent is hereby corrected as shown below:

Column 22, line 6, change "form-wire" to --four-wire--;

Signed and Sealed this

Twenty-fourth Day of May 1983

[SEAL]

Attest:

DONALD J. QUIGG

Attesting Officer     Acting Commissioner of Patents and Trademarks